July 6, 1954  L. A. SAFFORD  2,683,261
DIFFERENTIAL SIGNAL CONTROL MECHANISM FOR AIR BRAKES
Filed April 6, 1953  2 Sheets-Sheet 1

INVENTOR
Lewis A. Safford

BY  Dodge and Sons

ATTORNEYS

July 6, 1954            L. A. SAFFORD            2,683,261
DIFFERENTIAL SIGNAL CONTROL MECHANISM FOR AIR BRAKES
Filed April 6, 1953                         2 Sheets-Sheet 2
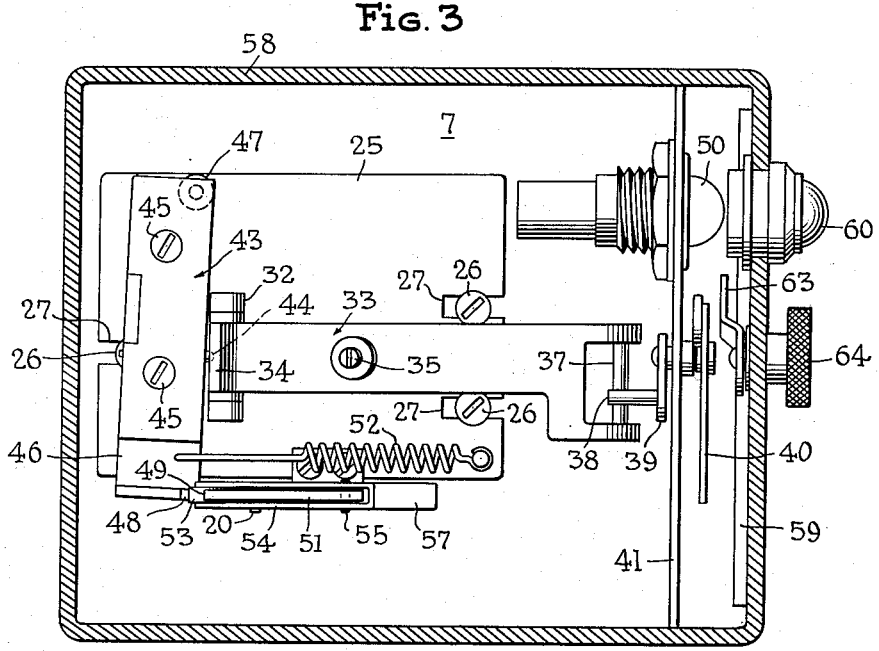
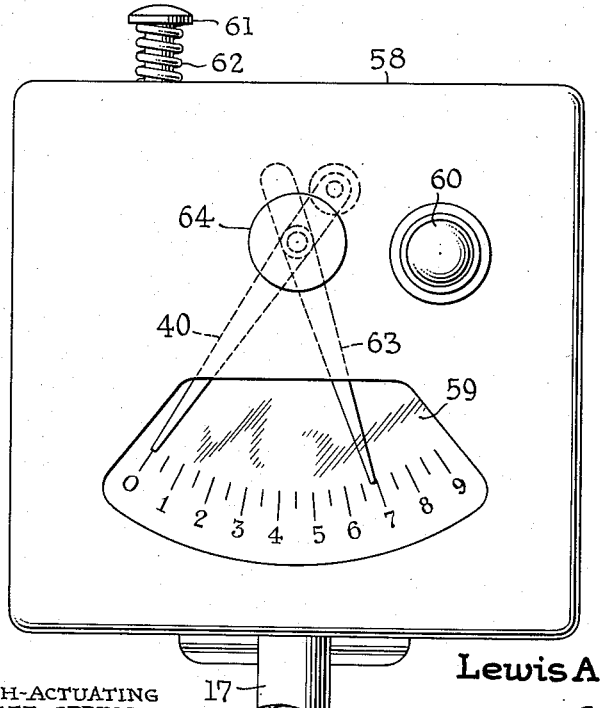
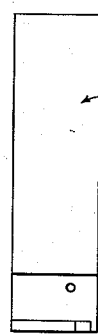
SWITCH-ACTUATING PLUNGER SPRING-BIASED OUTWARD TO CLOSE SWITCH.
INVENTOR.
Lewis A. Safford
BY
ATTORNEYS Patented July 6, 1954

2,683,261

UNITED STATES PATENT OFFICE 2,683,261

DIFFERENTIAL SIGNAL CONTROL MECHANISM FOR AIR BRAKES

Lewis A. Safford, Watertown, N. Y., assignor to The New York Air Brake Company, a corporation of New Jersey Application April 6, 1953, Serial No. 346,996

5 Claims. (Cl. 340—327)

This invention relates to air brakes and particularly to release indicators.

In the patent to Vroman, 2,491,344, December 13, 1949, there is described a device effective during releases to indicate whether the brakes at the rear end of a long train have released, and effective when the train is running to warn the engineer whenever a brake pipe pressure reduction sufficient to cause a brake application is started at any point in the train. The desired indications are secured by measuring the differential between pressure at the discharge connection of the feed valve, and pressure simultaneously existing in the brake pipe, while the engineer's brake valve is in running position. Since the engineer's brake valve offers a definite resistance to flow, the rate of flow is a function of the pressure drop between the two connections mentioned. When the most remote control valve (AB valve) has moved to release position, the flow rate through the brake pipe decreases rather sharply, but continues at a relatively low rate until all reservoirs are charged. The Vroman device, normally responds to the decrease just mentioned. With a brake pipe having no more than the normal leakage, this occurs when brake pipe pressure is about 4 p. s. i. below feed valve pressure.

The Vroman indicator secures the desired indication without in any way changing the operating characteristics of the brake system, and has saved many trans from being pulled in two by premature starts. Like most mechanical devices it is subject to performance limitations, and a leaky brake pipe will delay its response to completion of release.

The engineer soon knows if his brake pipe is leaky, but seldom can correct the condition. Unless the leakage is prohibitively large, he has to start some time. If he does so while the Vroman device indicates incomplete release he can only rely on an intelligent guess that the brakes have in fact completely released. If he guesses correctly he does not pull the train apart, but until the device resets he must do without one of the most valuable subsequent indications offered by the Vroman device. This is the immediate indication of a brake pipe pressure reduction sufficient to cause an application of the brakes. An unexpected application starting near the rear end while the train is moving can lead to as much damage as does a premature start, unless the throttle is promptly closed. Such an application might start at any time after the train is in motion.

The present invention affords manual means by which an engineer can reset an indicator of the Vroman type and at the same time condition it to respond to a subsequent brake pipe reduction, even one occurring before recharge is completed. Completion of recharge restores the indicator to its original functional condition. Thus, if the engineer elects to ignore the non-release indication, because he knows he has a leaky brake pipe, he can, by merely pressing a button, set the device to warn him to close his throttle and do so within seconds after an application starts at any point in the train.

A practical embodiment of the concept will now be described by reference to the accompanying drawings—

Figure 3 is a section on the line 3—3 of Figure 1.

Figure 4 is a front elevation showing the dial, the coacting hand and the warning light bull's-eye.

Figure 5 is an elevation of a commercial sensitive switch with a legend indicating the operative characteristics of its actuator when used in the preferred embodiment of the invention, Figures 1–4.

Figure 1:
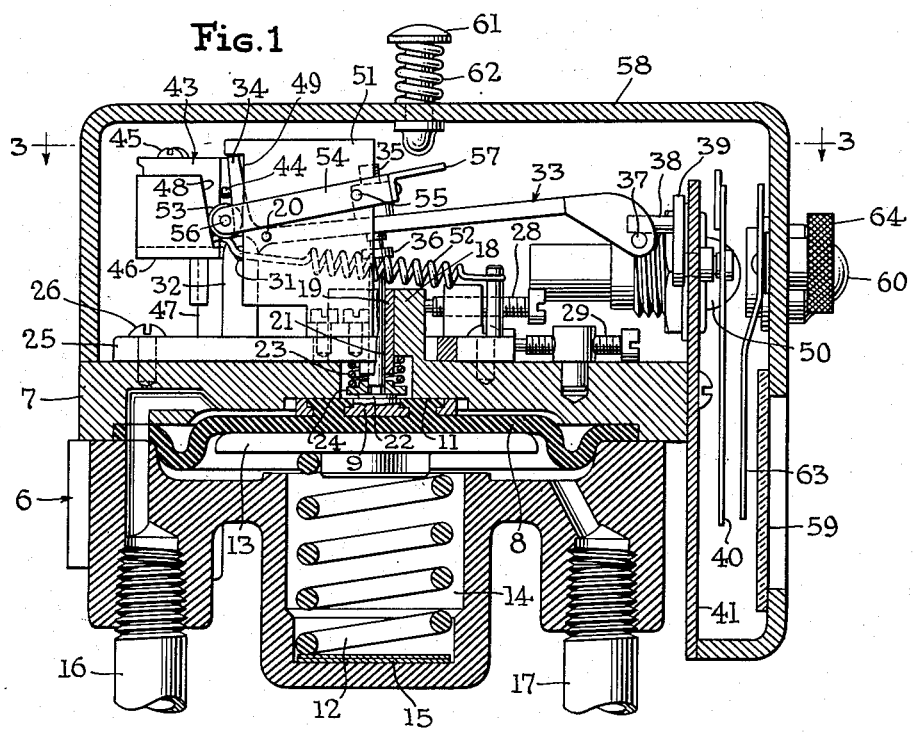
Figure 1 shows the indicator in vertical axial section.

The main housing comprises a base section 6 and a cap 7 between which the pressure-responsive diaphragm 8 is clamped at its periphery, an annular seat being formed in cap 7 to receive and confine it. Moulded into the upper face at the center of diaphragm 8 is a thrust plate 9 which reacts against the thrust pin of the switch-actuating mechanism, and at the desired limit of motion engages the surface 11 of a recess formed in the lower face of cap 7.

A helical spring 12 reacts through thrust-disc 13 against the lower face of diaphragm 8. The spring is seated in pocket 14 and its height is adjusted by shims 15 so that when thrust plate 9 just engages surface 11 the spring is unstressed.

The connection 16 leads from the discharge connection of the feed valve to the space above diaphragm 8. The connection 17 leads from the brake pipe to the space below the diaphragm 8.

The connections 16 and 17 thus correspond to the connections 31 and 32 of the Vroman patent. It is deemed to be unnecessary to elaborate here the system connections since they follow the Vroman disclosure and are in extensive use.

On the upper face of cap 7 is an upstanding boss 18 bored to receive a tubular guide bushing 19 in which the thrust stem 21 is accurately, but freely guided. At its lower end, stem 21 has a disc-shaped head 22 which engages the thrust plate 9. A relatively light coil compression spring 23 housed in a bore in the lower face of cap 7 reacts on head 22 through spring seat 24.

Figure 2:
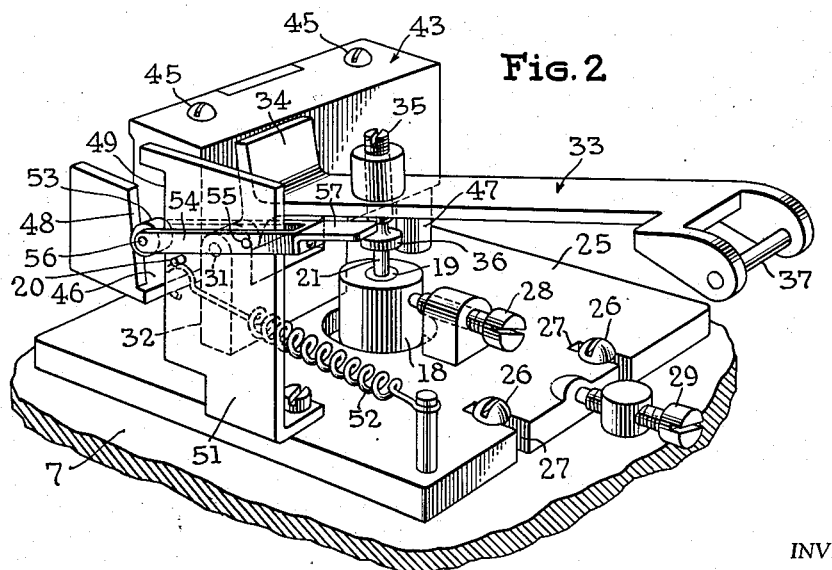
Figure 2 shows the switch and the switch-actuating mechanism in perspective.

An adjustable plate 25 overlies cap 7 and has a hole which freely encircles boss 18. Screws 26 in slots 27 guide the plate and when set down, clamp it in its adjusted positions. Opposed thrust screws 28 and 29 are used to make the adjustment. The arrangement of screws 28 and 29 is so clearly shown in Figure 2 that elaborate description is unnecessary.

The slots 27 define the direction of adjustment. At 90° to this direction is the hinge pin 31, carried by a forked upstanding bracket 32 fixed to the upper surface of plate 25. The pin 31 serves as fulcrum for a bell crank lever having a nearly horizontal arm 33 which overlies the upper end of thrust stem 21, and an upright arm 34, which as will be explained, engages the switch actuator. A thrust screw 35 threaded through arm 33 carries an enlarged flat disc 36 which engages the end of stem 21. Adjustment of plate 25 changes the distance from the axis of fulcrum pin 31 to the point of engagement of the disc and pin.

The outer end of arm 33 is forked and carries a hardened cross-pin 37. This underlies a crank pin 38 carried by crank arm 39 on the arbor on which the indicating hand 40 is mounted. This hand coacts with graduations on a dial marked in the face of the vertical plate 41. The dial is clearly illustrated in Figure 4. The graduations marked with the numerals "1," "2," "3," etc., to "9" represent in pounds per square inch the amount brake pressure is below feed valve pressure. The hand itself is counterbalanced so as to be indifferent to gravity. The weight of crank arm 39 maintain contact between the cross pin and the crank pin.

The movements of the hand give a quantitative indication of the differential between brake pipe pressure and the pressure maintained by the feed valve. Adjustment of screw 35 is a zeroing adjustment and adjustment of plate 25 (when screws 26 are loosened) will conform the motion ratio to the scale of spring 12.

The signal circuit includes a sensitive switch which is biased in a closing direction and controls the circuit through a warning light 50, so that the light burns during releases until a drop in the brake pipe flow rate indicates that the last control valve has shifted to release position and opens the switch. This assumes that there is no excessive brake pipe leakage.

So far as is material the switch, which is a commercial form of sensitive switch, comprises a case 43 in form substantially a rectangular parallelpiped, with a projecting thrust stem or actuator 44, which causes the enclosed switch mechanism to open or close in response to opposite axial motion of the stem amounting to a very few thousandths of an inch. The stem 44 is positioned to engage the face of arm 34 and the switch construction may be such as to afford lost motion of the stem 44 equal to that which would be caused by motion of stem 21 in response to a brake pipe pressure change of 1.00±0.25 p. s. i. The manufacturers of these sensitive switches will furnish them with a desired lost motion characteristic. As used here such lost motion characteristic merely protects the switch against response to minor reductions of brake pipe pressure and so has a stabilizing effect.

The switch case 43 is held by screws 45 to a plate 46 which is mounted at one end on a vertical hinge axis indicated generally at 47, and carries at the other end and up-standing stop-flange having an inclined stop-face 48. Opposed to this is a vertical stop-face 49 carried by the bracket 51. A coil tension spring 52 biases the plate to urge the stop-face 48 toward the stop-face 49. Approach is limited by an interposed ring 53 whose vertical position is subject to change by means which will now be described.

A bifurcated lever 54 straddles the bracket 51 and is fulcrummed thereon at 55. The ring 53 encircles loosely the pin 56. At the opposite end of the lever is a thrust plate 57. A case 58 encloses the mechanism carried by the cap 7 (including the dial and hands) and has a glazed window 59, and a red lens or bull's-eye 60 over lamp 50. A push-button 61 with retracting spring 62 is guided in the top of the case 58 and when depressed engages thrust plate 57. This lifts the ring 53 to the upper (wider) portion of the interval between the stop-surfaces 48, 49.

The spring 52 then shifts plate 46 until the switch plunger is pressed in full stroke, opening the signal circuit. On release of the button the ring 53 is allowed to drop as far as it will go into the tapering interval between the stop-surfaces 48 and 49. A stop-pin 20 establishes a maximum limit for downward motion of lever 54 and ring 53.

Thereafter, if pressure in the brake pipe falls, lever 33 will move downward, the switch 43 will close and the signal light 50 will light, warning the engineer.

The surfaces 48 and 49 and the ring 53 make up what may be called for the purposes of this application "an irreversible wedging stop." It is irreversible because the ring locks the surfaces 48, 49 against further approach. The relative angle of the surfaces is below the angle of repose for the ring. The term wedging implies progressive take-up but not the development of a significant force urging the surfaces 48, 49 apart. Obviously the gravity bias of ring 53 can produce engagement and nothing more.

Many specifically different irreversible wedging stops could be devised but the one illustrated is simple and satisfactory.

A second hand 63 (called the "red" hand) is mounted in case 58 coaxially with the "black" hand 40 and may be set by the knob 64. It can be set to indicate the pressure at which release can be expected to be complete, according to an estimate based on train length and condition. It is simply a convenient means for relieving the engineer of the trouble of remembering his estimate.

There are several advantages offered by the construction. The switch is yieldingly mounted and so can absorb some of the motion of the switch-actuating element. The yielding mount will resist more force than is necessary to open the switch.

If the engineer decides that the brakes have in fact released and that leakage is delaying the signal, and as a consequence decides to press the reset button, by doing so he destroys the previously existing adjustment of the switch body in which the rising brake pipe pressure had failed to open the switch and upon release of the button establishes a new adjustment in which the switch is held open, desirably with a brake pipe pressure margin of about 1 p. s. i.

This new adjustment terminates the light signal but conditions the signal to respond to a brake pipe pressure reduction. In short, pressing the button overrides the signal indication as to pressure rise, but conditions the signal to respond to pressure fall. The new adjustment is in accord with brake pipe conditions at the time it is made, and these are indicated by hand 40, which is not affected by button 61.

The two-armed lever 33, 34 moves in response to variations of a physical quantity, in this case the pressure differential between feed valve and brake pipe pressures. The switch unit has a housing which encloses the switch (whose mechanical details are not here material) and guides the switch actuator which, as here used, is a plunger biased outward. In the illustrated example outward plunger motion of limited extent closes the switch.

The actuator is in one way operative engagement with the arm 34 of the lever. Simple thrust engagement is shown and the outward bias of the plunger produces such engagement. The housing is guided in a path which shifts the switch actuating plunger in the general direction of its axis and so changes the point in the motion of lever 33, 34 at which the lever causes the switch to shift. The spring 52 urges the housing in a direction which would cause the actuator 44 to be forced inward at a lower brake pipe pressure. When the button 61 is pressed and released the ring 53 acts as an adjustable irreversible stop and fixes the switch housing in a position in which the switch is held open by lever arm 34 but will close as this arm retreats slightly—i. e., in response to a brake pipe pressure reduction of about 1 p. s. i.

The above-described operative characteristics can be attained by various different mechanical arrangements. The one chosen for illustration makes it possible to use a commercial switch and provides means to afford a simple progressive indicator hand in conjunction with the signal light. It is considered desirable to have the light burn until the brakes have released but simple mechanical reversals can be availed of to have it light when release is completed if that be preferred.

What is claimed is:

1. A control unit characterized by a definite control point and having an actuator shiftable in relatively reverse directions through a limited range in which it moves the control unit through its control point, said actuator being lightly biased in one of said directions; a responsive member which moves in relatively reverse directions in response to variations of a physical quantity, through a much larger range and is in one-way actuating engagement with and opposes the bias of said actuator, whereby in a minor portion of its motion range it serves to cause the actuator to shift; means serving to guide the control unit in a path whose range and direction conform approximately to those of the responsive member, whereby the control point of the control unit is shifted relatively to the position of the responsive member; means biasing the control unit in said path in a direction to establish said one-way engagement with a force sufficient to overpower the bias of said actuator; one-way engaging means preventing motion of said unit in response to the last named biasing means while permitting reverse motion; and manually operable means for temporarily releasing said one-way engaging means.

2. The combination of a signal circuit; a switch controlling said circuit said switch being characterized by a definite control point and having an actuator shiftable in relatively reverse directions through a limited motion range in which it shifts the switch past its control point, said actuator being biased in one of said directions; a responsive member which moves in response to variations of pressure in relatively reverse directions through a larger range and is in one-way actuating engagement with and opposes the bias of said actuator, whereby in a minor portion of its motion range the responsive element causes the switch to shift past its control point; means serving to guide the switch in a path whose range and direction conform approximately to those of the responsive member, whereby the control point of the switch may be changed relatively to the position of the responsive member; means biasing the switch in said path in a direction to maintain said one-way actuating engagement with a force sufficient to overpower the bias of said actuator; one-way engaging means serving to prevent motion of said switch in response to the last named biasing means while permitting reverse motion; and manually operable means for temporarily releasing said one-way engaging means.

3. The combination of a responsive member arranged to move in relation to a variable physical quantity; a switch unit including a housing, a switch and a switch actuator supported by said housing, the actuator being capable of limited motion relatively to the housing and being yieldingly biased toward one-way operative engagement with said responsive member; means serving to guide said housing in movements which change the point of switch-shifting reaction between the responsive member and the switch actuator; yielding means urging said housing in a direction to oppose the bias of said actuator with a force sufficient to overcome said bias; a releasable irreversible wedging stop for limiting the motion of said housing under the urge of said yielding means; means serving to cause said stop to move to engagement; manually operable means to withdraw said stop from engagement; and a signal controlled by said switch.

4. The combination defined in claim 3 in which the irreversible wedging stop comprises two relatively inclined stop surfaces, and a cylindrical connector guided in motion between said surfaces to and from positions in which it engages both and serves as a thrust connection between them.

5. The combination defined in claim 3 in which the switch actuator is a plunger biased outward relatively to the housing and acts in thrust with said responsive member.

References Cited in the file of this patent
UNITED STATES PATENTS

| Number | Name | Date |
|---|---|---|
| 1,395,826 | Hopkins | Nov. 1, 1921 |
| 2,420,481 | Jackson et al. | May 13, 1947 |
| 2,439,474 | Kennelly | Apr. 13, 1948 |
| 2,582,483 | Hallerberg | Jan. 15, 1952 |